(12) United States Patent
Kuntz

(10) Patent No.: US 8,061,878 B1
(45) Date of Patent: Nov. 22, 2011

(54) SYSTEM FOR ILLUMINATING AN AREA REARWARD OF A VEHICLE AND ASSOCIATED METHOD

(76) Inventor: Tiffany Kuntz, Cruz Bay St. John, VI (US)

( * ) Notice: Subject to any disclaimer, the term of this patent is extended or adjusted under 35 U.S.C. 154(b) by 378 days.

(21) Appl. No.: 12/460,291

(22) Filed: Jul. 17, 2009

(51) Int. Cl.
*B60Q 1/00* (2006.01)
(52) U.S. Cl. .................. 362/464; 362/505; 362/276
(58) Field of Classification Search .................. 362/464, 362/465, 466, 505, 543, 540, 506, 276, 802
See application file for complete search history.

(56) References Cited

U.S. PATENT DOCUMENTS

| | | | | |
|---|---|---|---|---|
| 3,761,706 A * | 9/1973 | Frey | ............................... | 362/490 |
| 4,041,302 A * | 8/1977 | Koljonen | ...................... | 362/464 |
| 4,251,103 A * | 2/1981 | Nakajima et al. | ............. | 362/505 |
| 5,566,384 A * | 10/1996 | Chien | ........................... | 362/486 |
| 6,260,988 B1 * | 7/2001 | Misawa et al. | ................ | 362/276 |
| 2003/0231503 A1* | 12/2003 | Therriault et al. | ............ | 362/464 |
| 2007/0242470 A1* | 10/2007 | Michiyama | ................... | 362/464 |

* cited by examiner

*Primary Examiner* — Bao Q Truong

(57) ABSTRACT

A combined vehicle and associated rear-lighting system includes a vehicle provided with a steering system having a first sensor coupled thereto, and a propulsion system having a second sensor coupled thereto. Such first and second sensors detect a plurality of vehicle operating parameters associated with the steering and propulsion systems during driving conditions respectively. A rear-lighting system coupled to a rear bumper of the vehicle and emits a plurality of light rays along the rear pathway extending rearwardly away from the rear bumper of the vehicle. Notably, the rear-lighting system may be communicatively coupled to the steering and propulsion systems respectively. In this manner, the rear-lighting system is responsive to the vehicle operating parameters such that the light rays are synchronously and uniformly oscillated in a direction corresponding to a travel route and a travel speed of the vehicle respectively.

17 Claims, 5 Drawing Sheets

SYSTEM FOR ILLUMINATING AN AREA REARWARD OF A VEHICLE AND ASSOCIATED METHOD

CROSS REFERENCE TO RELATED APPLICATIONS

This application claims the benefit of U.S. Provisional Application No. 61/132,726, filed Jun. 23, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle illuminating systems and, more particularly, to a vehicle illuminating system for providing users with an effective mechanism to illuminate the area behind their vehicle when they are backing up.

2. Prior Art

When driving a motor vehicle rearward with little or without any ambient illumination, the only vehicle lighting rearward of the motor vehicle is generally provided by the reverse signaling lamps. Unfortunately, conventional reverse signaling lamps are not designed to illuminate the ground, and indeed often do not provide satisfactory lighting for safe rearward driving. In recognizing the problem, certain vehicle manufacturers have taken measures to provide additional ground illumination rearward of the vehicle. In particular, one prior art example incorporates separate reverse signaling lamps and ground illumination lamps for vehicles. However, separate reverse signaling and ground illumination lamps are cost prohibitive, and raise engineering and styling issues, as additional lamps must now be incorporated onto the vehicle.

Also, generally directly to the rear of any motor vehicle there exists a blind spot. In other words, such a blind spot is an area where the operator is precluded from having sight. Any light to the rear of the vehicle applied to this area is of little or no benefit to the operator. Conventional reverse signaling lamps typically project light into this area. Depending on the vehicle, the size of the blind spot can substantially change. For example, for a small car with a very short vehicle length rearward of the operator the length of the blind spot may be 1-2 meters. However, for other vehicles such as a large pick-up truck for example, the blind spot may be up to 10 meters.

Accordingly, a need remains for a system for illuminating an area rearward of automobiles and the like in order to overcome the above-noted shortcomings. The present invention satisfies such a need by providing a system that is convenient and easy to use, is durable in design, is versatile in its applications, and is instrumental in reducing reversing accidents.

BRIEF SUMMARY OF THE INVENTION

In view of the foregoing background, it is therefore an object of the present invention to provide a combined vehicle and associated rear-lighting system for illuminating a rear pathway during driving conditions. These and other objects, features, and advantages of the invention are provided by a combined vehicle and associated rear-lighting system including a vehicle provided with a steering system having a first sensor coupled thereto, and a propulsion system having a second sensor coupled thereto. Such first and second sensors detect a plurality of vehicle operating parameters associated with the steering and propulsion systems during driving conditions respectively.

The present invention further includes a rear-lighting system coupled to a rear bumper of the vehicle. Such a rear-lighting system emits a plurality of light rays along the rear pathway extending rearwardly away from the rear bumper of the vehicle. Notably, the rear-lighting system may be communicatively coupled to the steering and propulsion systems respectively. In this manner, the rear-lighting system is responsive to the vehicle operating parameters such that the light rays are synchronously and uniformly oscillated in a direction corresponding to a travel route and a travel speed of the vehicle respectively.

The rear-lighting system preferably includes a housing be affixed to a rear bumper of the vehicle, and a plurality of lighting fixtures juxtaposed side-by-side within the housing. Each lighting fixture preferably emits a corresponding one of the light rays. Also, a plurality of reflector mirrors are disposed within the housing and are preferably coupled to the light fixtures respectively.

The rear-lighting system may further include a mechanism for automatically oscillating the reflector mirrors along respective arcuate paths such that the light rays synchronously and uniformly oscillate along an angle offset from a centrally oriented vertical axis of the vehicle.

The rear-lighting system may further include a controller communicatively coupled to the automatic oscillating means as well as the steering and propulsion systems. Such a controller generates and transmits a plurality of control signals to the automatic oscillating mechanism upon learning the operating parameters of the steering and propulsion systems respectively.

The automatic oscillating mechanism preferably includes a motor communicatively coupled to the controller. Such a motor is communicatively coupled to the controller and is responsive to the control signals respectively such that the motor is automatically toggled between alternate operating modes.

In one embodiment, the automatic oscillating means further includes a plurality of hinges directly connected to the reflector mirrors respectively. Such hinges may be pivotally biased along clockwise and counter clockwise directions when the motor is automatically toggled between the alternate operating modes respectively. In this manner, such reflector mirrors rotate in sync as the hinges pivot and thereby direct the light rays along the direction.

In another embodiment, the automatic oscillating means may include a plurality of positive and negative magnetic cams dynamically mated to anterior and posterior faces of the reflector mirrors respectively. A plurality of electro-magnetically polarized plates may be statically mated to top and bottom interior surfaces of the housing respectively. A toggle switch may be electrically coupled to an internal power source of the vehicle as well as the electro-magnetically chargeable plates respectively. Such a toggle switch is responsive to the first and second control signals and is thereby biased between open and closed positions respectively.

Notably, each electro-magnetically chargeable plate generates positive and negative magnetic fields and thereby simultaneously attracts and repels the positive and negative magnetic cams along mutually exclusive linear paths defined along the anterior and posterior faces of the reflector mirrors respectively. In this manner, each reflector mirror is caused to rotate along first and second arcuate paths as the positive and negative magnetic cams linearly reciprocate along the anterior and posterior faces respectively.

The present invention further includes a method for automatically illuminating a rear pathway of a vehicle during driving conditions. Such a method preferably includes the chronological steps of: providing a vehicle including a steering system having a first sensor coupled thereto, and a propulsion system having a second sensor coupled thereto; providing and communicatively coupling a rear-lighting system to the steering and propulsion systems respectively. Such a rear-lighting system further may be coupled to a rear bumper of the vehicle.

The method may further include the chronological steps of: emitting a plurality of light rays along the rear pathway extending rearwardly away from a rear bumper of the vehicle; the first and second sensors detecting a plurality of vehicle operating parameters associated with the steering and propulsion systems during driving conditions respectively; and the rear-lighting system responding to the vehicle operating parameters and thereby causing the light rays to synchronously and uniformly oscillate in a direction corresponding to a travel route and a travel speed of the vehicle respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
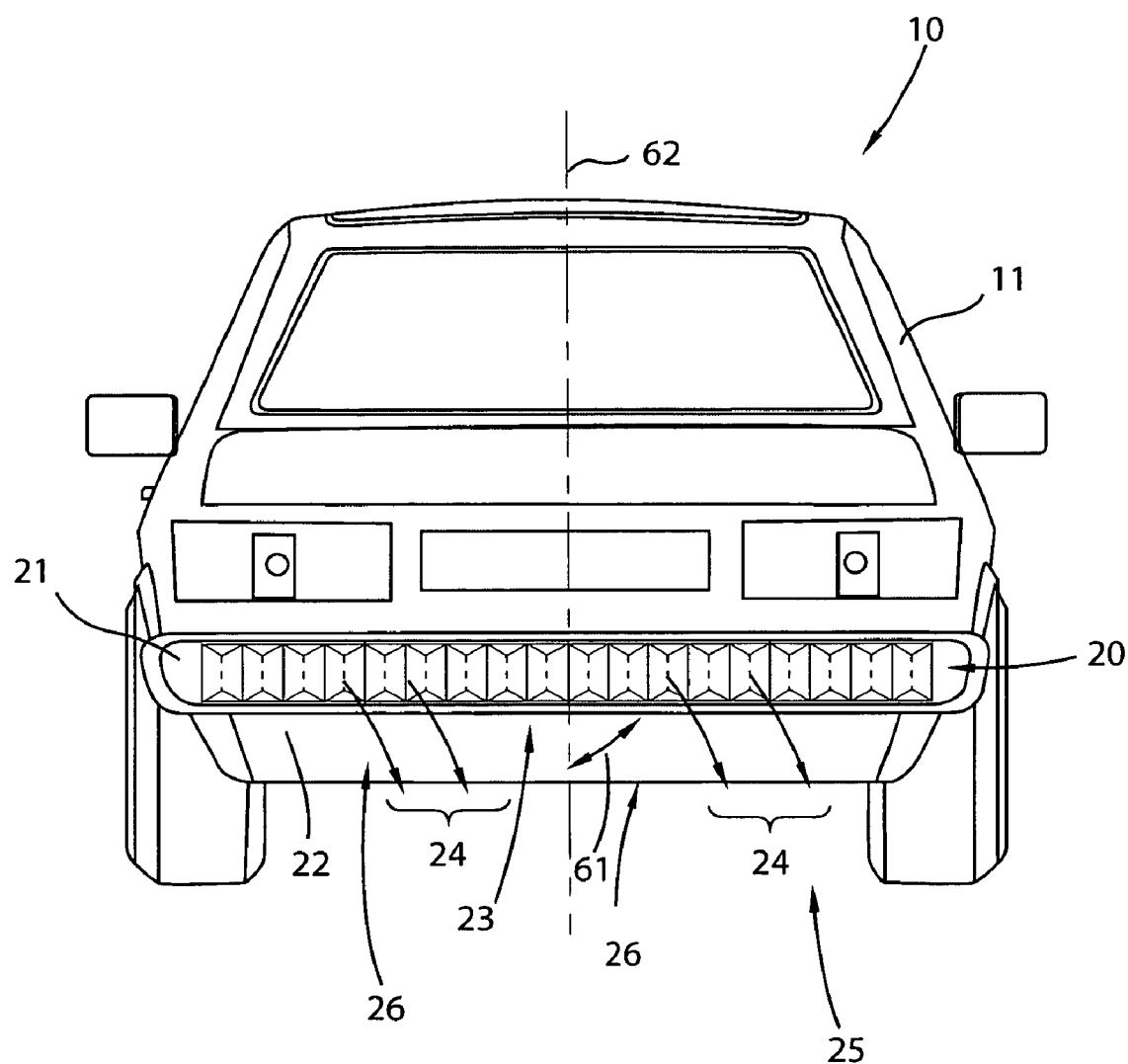
FIG. 1 is a perspective view showing front elevational view showing the vehicle light diffusing assembly attached to rear bumper of a vehicle, in accordance with one embodiment of the present invention.
Figure 2:
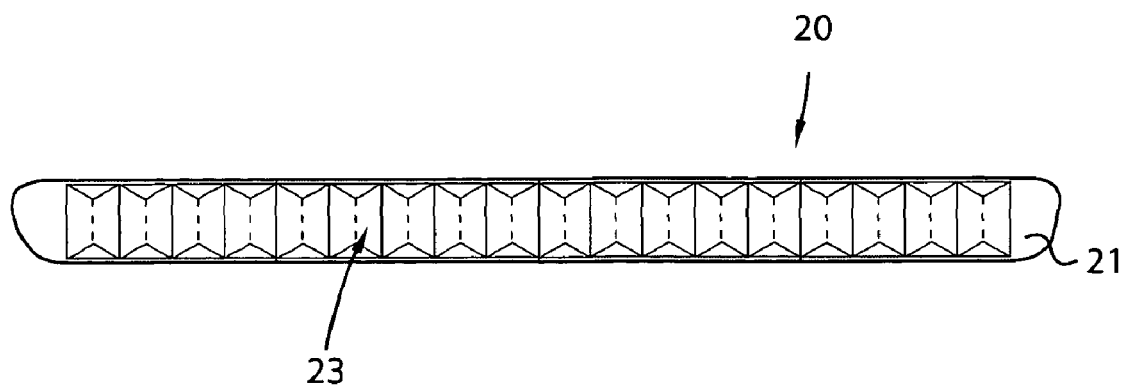
FIG. 2 is a front elevational view of the rear-lighting system shown in FIG. 1.
Figure 3:
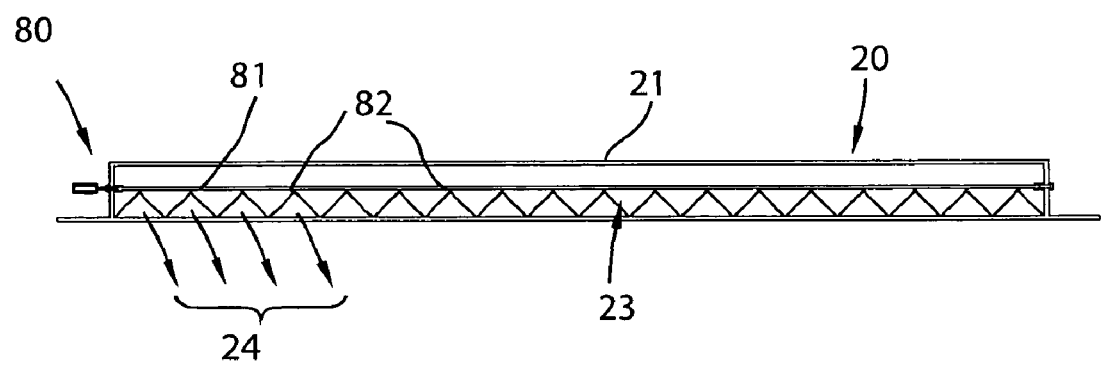
FIG. 3 is a cross-sectional view showing a plurality of reflector mirrors pivotally anchored to a hydraulic piston wherein the reflector mirrors are juxtaposed side-by-side within a housing of the rear-lighting system.
Figure 4:
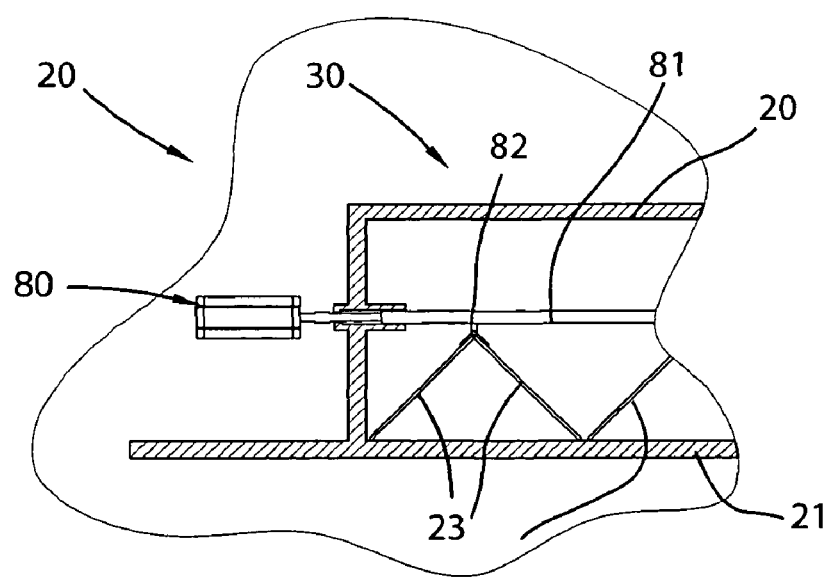
FIG. 4 is an enlarged, partial cross-sectional view of FIG. 3.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-9 by reference numeral 10 and is intended to provide a combined vehicle 11 and associated rear-lighting system 20 for illuminating a rear pathway 25 extending rearwardly from a back of the vehicle 11. It should be understood that the present invention may be used to illuminate a rear pathway 25 of many different types of vehicle and should not be limited to only land vehicles described herein.

Referring to FIGS. 1-9 in general, a combined vehicle 11 and associated rear-lighting system 20 is disclosed as including a vehicle 11 provided with a steering system 50 having a first sensor 31 coupled thereto, and a propulsion system 60 having a second sensor 32 coupled thereto. Such first and second sensors 31, 32 detect a plurality of vehicle operating parameters associated with the steering and propulsion systems 50, 60 during driving conditions respectively. For example, the vehicle velocity and turning radius are detected by the relative positions of the steering wheel and speedometer.

The present invention 10 further includes a rear-lighting system 20 coupled to a rear bumper 22 of the vehicle 11. Such a rear-lighting system 20 emits a plurality of light rays 24 along the rear pathway 25 extending rearwardly away from the rear bumper 22 of the vehicle 11. Notably, the rear-lighting system 20 may be communicatively coupled to the steering and propulsion systems 50, 60, respectively. In this manner, the rear-lighting system 20 is responsive to the vehicle 11 operating parameters such that the light rays 24 are synchronously and uniformly oscillated in a direction 26 corresponding to a travel route and a travel speed of the vehicle 11, respectively. Advantageously, the light rays 24 may be automatically oscillated in a higher or lower direction 26 when the vehicle speed increases and decreases, for example. Also, the light rays 24 may be automatically oscillated in a greater or lesser angle 61 when the turning radius is larger or smaller, for example.

By providing adequate illumination, especially in low ambient lighting conditions, the present invention 10 provides the unexpected and unpredictable benefit of superior vision to the rear of their vehicle 11 than is usually possible.

This not only reduces the incidences of striking objects located behind the automobile, but also increases the likelihood of a motorist seeing a pedestrian located behind their vehicle 11.

The rear-lighting system 20 preferably includes a housing 21 affixed to the rear bumper 22 of the vehicle 11, and a plurality of lighting fixtures 28 juxtaposed side-by-side within the housing 21. Each lighting fixture 28 preferably emits a corresponding one of the light rays 24. Also, a plurality of reflector mirrors 23 are disposed within the housing 21 and are preferably coupled to the light fixtures 28 respectively.

Figure 7:
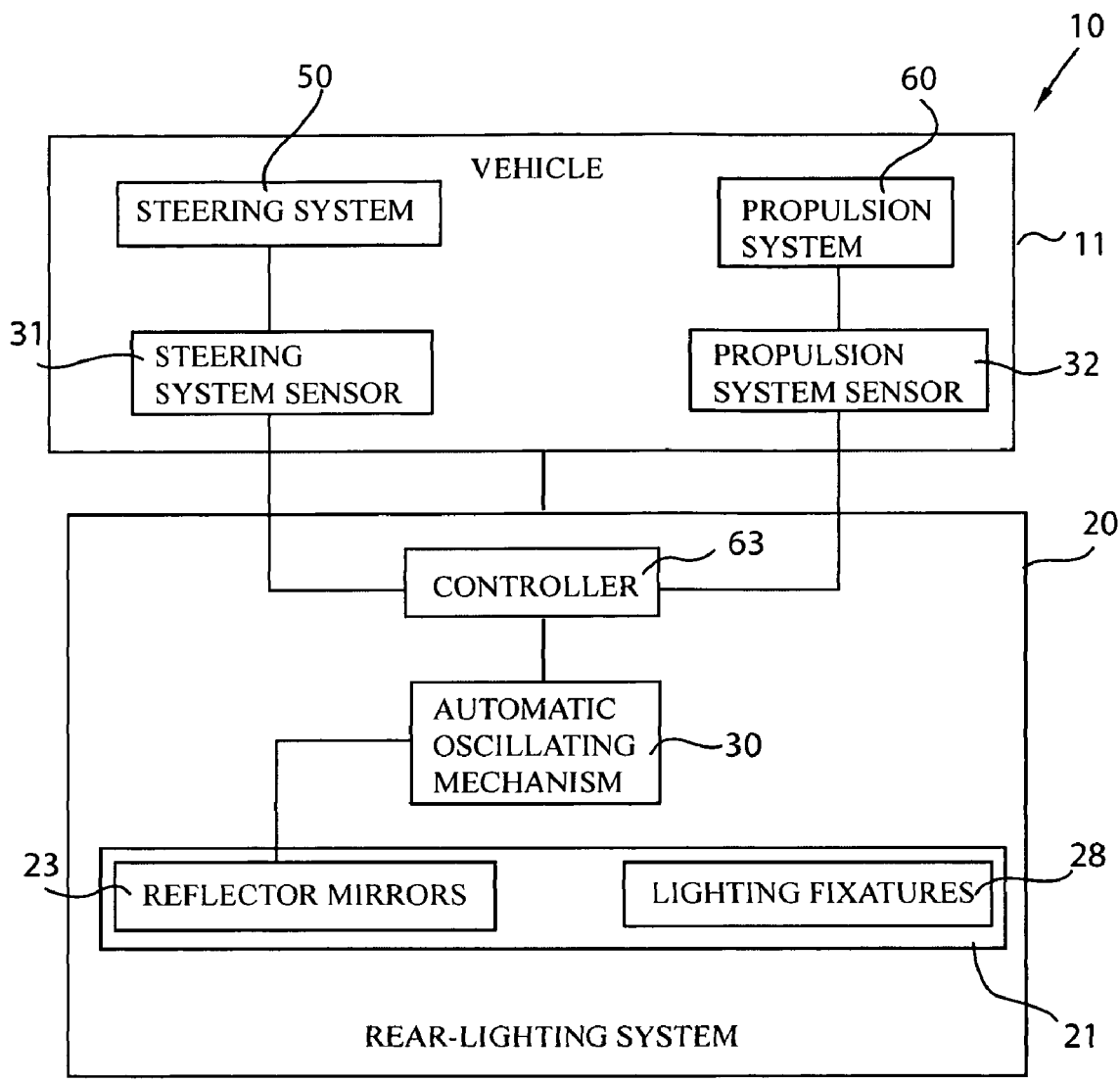
FIG. 7 is a high-level schematic block diagram showing the interrelationship between the major components of the present invention.
Figure 8:
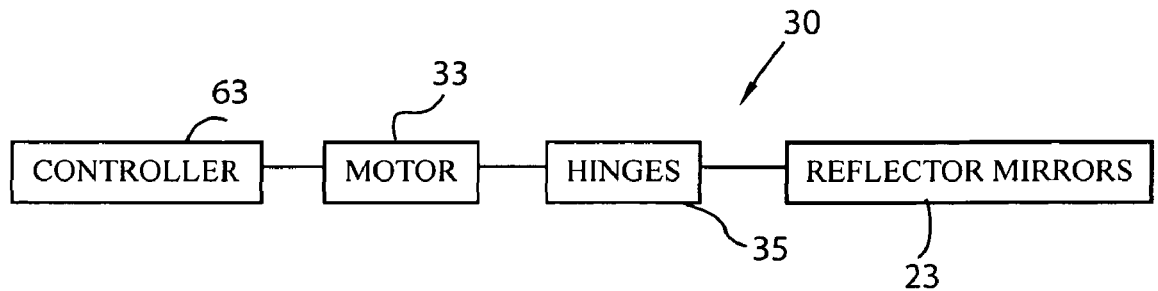
FIG. 8 is a schematic diagram showing the interrelationship between the major components of an alternate embodiment of the automatic oscillating mechanism.
Figure 9:
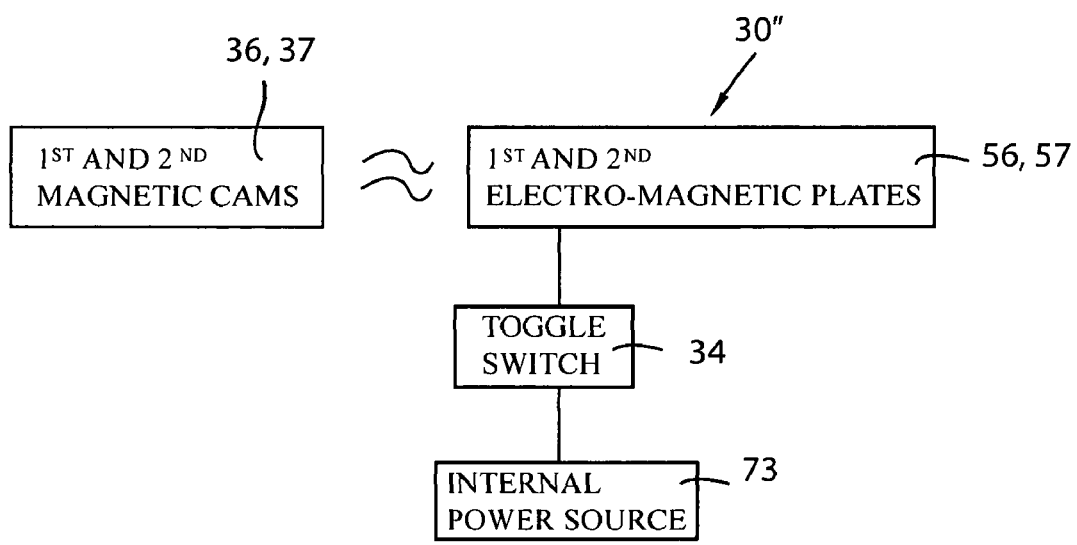
FIG. 9 is a schematic diagram showing the interrelationship between the major components of yet another embodiment of the automatic oscillating mechanism.

As perhaps best shown in FIGS. 7-9, the rear-lighting system 20 may further include a mechanism 30 for automatically oscillating the reflector mirrors 23 along respective arcuate paths 79, 80 such that the light rays 24 synchronously and uniformly oscillate along an angle 61 offset from a centrally oriented vertical axis 62 of the vehicle 11. As noted above, such an angle 61 is automatically oscillated in accordance with the status of the steering and speed parameters of the vehicle 11.

The rear-lighting system 20 may further include a controller 63 communicatively coupled to the automatic oscillating mechanism 30 as well as steering and propulsion systems 50, 60. Such a controller 63 generates and transmits a plurality of control signals to the automatic oscillating mechanism 30 upon learning the operating parameters of the steering and propulsion systems 50, 60, respectively.

Referring to FIG. 8, the automatic oscillating mechanism 30 preferably includes a motor 33 communicatively coupled to the controller 63. Such a motor 33 is responsive to the control signals respectively such that the motor 33 is automatically toggled between alternate operating modes respectively.

Referring to FIGS. 1-4, in one embodiment, the automatic oscillating mechanism 30 preferably includes a hydraulic piston 80 having a rectilinear shaft 81 passing through an entire longitudinal length of the housing 21. A plurality of spring-actuated hinges 82 are pivotally coupled to the shaft 81 and equidistantly spaced along a longitudinal length thereof. Reflector mirrors 23 are independently mated to corresponding hinges 82. Upon receiving the control signals from the controller 63, the shaft 81 of the hydraulic piston 80 linearly reciprocates along a longitudinal path and thereby causes the reflector plates 23 to oscillate in sync within the housing 21. Such synchronous oscillation causes the light rays 24 to change direction in accordance with the vehicle speed and steering parameters.

Figure 5:
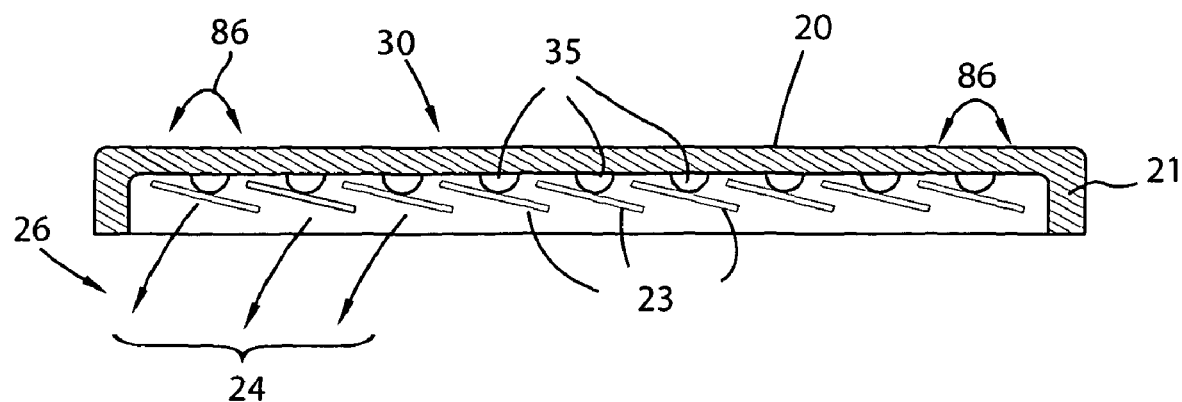
FIG. 5 a cross-sectional view showing each reflector plate pivotally mated to a separate hinge within the housing, in accordance with another embodiment of the present invention.

Referring to FIGS. 5 and 8, in one embodiment, the automatic oscillating mechanism 30' may include a plurality of hinges 35 directly connected to the reflector mirrors 23 respectively. Such hinges 35 may be pivotally biased along clockwise and counter clockwise 86 motions when motor 33 is automatically toggled between the alternate operating modes respectively. In this manner, such reflector mirrors 23 rotate in sync as the hinges 35 pivot and thereby direct the light rays 24 along the direction 26. FIG. 5 shows each reflector mirror 23' independently coupled to a separate hinge 35 in housing 21'.

Figure 6:
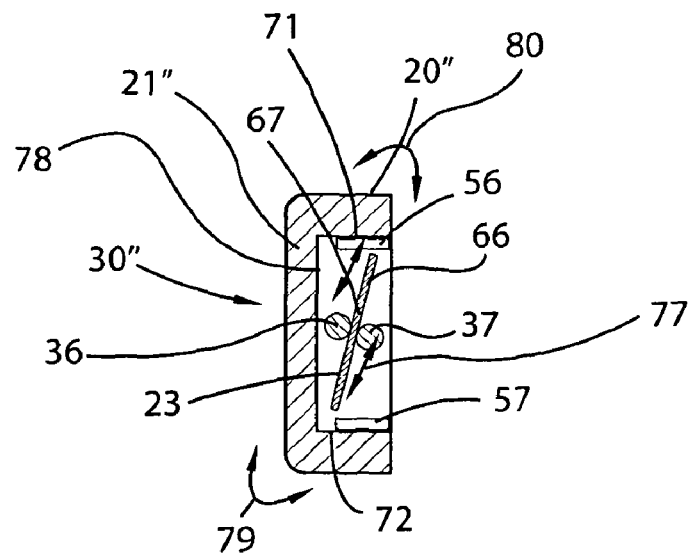
FIG. 6 a cross-sectional view showing a pair of magnetic cams and electro-magnetically charged plates, in accordance with yet another embodiment of the present invention.

Referring to FIGS. 6 and 9, in another embodiment, the automatic oscillating mechanism 30" may include a plurality of positive and negative magnetic cams 36, 37 dynamically mated to anterior 66 and posterior 67 faces of the reflector mirror 23 respectively. A plurality of electro-magnetically polarized plates 56, 57 may be statically mated to top and bottom interior surfaces 71, 72 of the housing 21", respectively. A toggle switch 34 may be electrically coupled to an internal power source 73 of the vehicle 11 as well as the electro-magnetically chargeable plates 56, 57 respectively. Such a toggle switch 34 is responsive to the first and second control signals and is thereby biased between open and closed positions respectively to open and close a circuit between the power source 73 and plates 56, 57. When the circuit is closed, power is transmitted to plates 56, 57 and thereby creates magnetic fields to attract Notably, each electro-magnetically chargeable plate. 56, 57 generates positive and negative magnetic fields 75, 76 and thereby simultaneously attracts and repels the positive and negative magnetic cams 36, 37 along mutually exclusive linear paths 77, 78 defined along the anterior 66 and posterior 67 faces of the reflector mirrors 23 respectively. In this manner, each reflector mirror 23 is caused to rotate along first and second arcuate paths 79, 80 as the positive and negative magnetic cams 36, 37 linearly reciprocate along the anterior 66 and posterior 67 faces respectively.

The present invention 10, as claimed, provides the unexpected and unpredictable benefit of automatically rotating the illumination angle 61 of the vehicle 11 rear lights in accordance with an angle of rotation associated with the steering wheel system 50 and rearward movement of the propulsion system 60 of the vehicle 11. The combination of such claimed elements provides an unpredictable and unexpected result which is not rendered obvious by one skilled in the art because it automatically toggling the angle 61 of light rays 24 base upon both a turning radius of the vehicle 11 as wheel as a reverse speed of the vehicle 11.

The present invention further includes a method for automatically illuminating a rear pathway 25 of a vehicle 11 during driving conditions. Such a method preferably includes the chronological steps of: providing a vehicle 11 including a steering system 50 having a first sensor 31 coupled thereto, and a propulsion system 60 having a second sensor 32 coupled thereto; providing and communicatively coupling a rear-lighting system 20 to the steering and propulsion systems 50, 60, respectively. Such a rear-lighting system 20 further may be coupled to a rear bumper 22 of the vehicle 11.

The method may further include the chronological steps of: emitting a plurality of light rays 24 along the rear pathway 25 extending rearwardly away from a rear bumper 22 of the vehicle 11; the first and second sensors 31, 32 detecting a plurality of vehicle 11 operating parameters associated with the steering and propulsion systems 50, 60 during driving conditions respectively; and the rear-lighting system 20 responding to the vehicle 11 operating parameters and thereby causing the light rays 24 to synchronously and uniformly oscillate in a direction 26 corresponding to a travel route and a travel speed of the vehicle 11 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined vehicle and associated rear-lighting system for illuminating a rear pathway during driving conditions, said combined vehicle and associated rear-lighting system comprising:
   a vehicle comprising a steering system and a propulsion system; and
   a rear-lighting system coupled to a rear bumper of said vehicle and emitting a plurality of light rays along the rear pathway extending rearwardly away from said rear bumper of said vehicle, said rear-lighting system being communicatively coupled to said steering and propulsion systems respectively;
   wherein said rear-lighting system is responsive to a plurality of vehicle operating parameters associated with said steering and propulsion systems respectively such that said light rays are synchronously and uniformly oscillated in a direction corresponding to said vehicle operating parameters respectively.

2. The combined vehicle and associated rear-lighting system of claim 1, wherein said rear-lighting system comprises:
   a housing affixed to a rear bumper of said vehicle;
   a plurality of lighting fixtures juxtaposed side-by-side within said housing, each said lighting fixture emitting a corresponding one of said light rays; and
   a plurality of reflector mirrors disposed within said housing and coupled to said light fixtures respectively.

3. The combined vehicle and associated rear-lighting system of claim 2, wherein said rear-lighting system further comprises:
   means for automatically oscillating said reflector mirrors along respective arcuate paths such that said light rays synchronously and uniformly oscillate along an angle offset from a centrally oriented vertical axis of said vehicle.

4. The combined vehicle and associated rear-lighting system of claim 3, wherein said rear-lighting system further comprises:
   a controller communicatively coupled to said automatic oscillating means as well as said steering and propulsion systems, said controller generating and transmitting a plurality of control signals to said automatic oscillating means upon learning said operating parameters of said steering and propulsion systems respectively.

5. The combined vehicle and associated rear-lighting system of claim 4, wherein said automatic oscillating means comprises:
   a motor communicatively coupled to said controller;
   a steering wheel sensor communicatively coupled to a steering wheel of said vehicle;
   a propulsion sensor communicatively coupled to a propulsion system of said vehicle; and
   wherein said motor is communicatively coupled to said controller and is responsive to said control signals respectively such that said motor is automatically toggled between alternate operating modes.

6. The combined vehicle and associated rear-lighting system of claim 5, wherein said automatic oscillating means further comprises: a plurality of hinges directly connected to said reflector mirrors respectively, said hinges being pivotally biased along clockwise and counter clockwise directions when said motor is automatically toggled between said alternate operating modes respectively, wherein said reflector mirrors rotate in sync as said hinges pivot and thereby direct said light rays along said direction.

7. The combined vehicle and associated rear-lighting system of claim 5, wherein said automatic oscillating means further comprises:
   a plurality of positive and negative magnetic cams dynamically mated to anterior and posterior faces of said reflector mirrors respectively;
   a plurality of electro-magnetically polarized plates statically mated to top and bottom interior surfaces of said housing respectively; and
   a toggle switch electrically coupled to an internal power source of said vehicle as well as said electro-magnetically chargeable plates respectively.

8. The combined vehicle and associated rear-lighting system of claim 7, wherein said toggle switch is responsive to said first and second control signals and is thereby biased between open and closed positions respectively;
   wherein said electro-magnetically chargeable plates generate positive and negative magnetic fields and thereby simultaneously attract and repel said positive and negative magnetic cams along mutually exclusive linear paths defined along said anterior and posterior faces of said reflector mirrors respectively;
   wherein each of said reflector mirrors is caused to rotate along first and second arcuate paths as said positive and negative magnetic cams linearly reciprocate along said anterior and posterior faces respectively.

9. A combined vehicle and associated rear-lighting system for illuminating a rear pathway during driving conditions, said combined vehicle and associated rear-lighting system comprising: a vehicle comprising
   a steering system having a first sensor coupled thereto;
   a propulsion system having a second sensor coupled thereto; and
   a rear-lighting system coupled to a rear bumper of said vehicle and emitting a plurality of light rays along the rear pathway extending rearwardly away from said rear bumper of said vehicle, said rear-lighting system being communicatively coupled to said steering and propulsion systems respectively;
   wherein said first and second sensors detect a plurality of vehicle operating parameters associated with said steering and propulsion systems during driving conditions respectively;
   wherein said rear-lighting system is responsive to said vehicle operating parameters such that said light rays are synchronously and uniformly oscillated in a direction corresponding to a travel route and a travel speed of said vehicle respectively.

10. The combined vehicle and associated rear-lighting system of claim 9, wherein said rear-lighting system comprises:
    a housing affixed to a rear bumper of said vehicle;
    a plurality of lighting fixtures juxtaposed side-by-side within said housing, each said lighting fixture emitting a corresponding one of said light rays; and
    a plurality of reflector mirrors disposed within said housing and coupled to said light fixtures respectively.

11. The combined vehicle and associated rear-lighting system of claim 10, wherein said rear-lighting system further comprises:
    means for automatically oscillating said reflector mirrors along respective arcuate paths such that said light rays synchronously and uniformly oscillate along an angle offset from a centrally oriented vertical axis of said vehicle.

12. The combined vehicle and associated rear-lighting system of claim 11, wherein said rear-lighting system further comprises:
- a controller communicatively coupled to said automatic oscillating means as well as said steering and propulsion systems, said controller generating and transmitting a plurality of control signals to said automatic oscillating means upon learning said operating parameters of said steering and propulsion systems respectively.

13. The combined vehicle and associated rear-lighting system of claim 12, wherein said automatic oscillating means comprises: a motor communicatively coupled to said controller;
- wherein said motor is communicatively coupled to said controller and is responsive to said control signals respectively such that said motor is automatically toggled between alternate operating modes.

14. The combined vehicle and associated rear-lighting system of claim 13, wherein said automatic oscillating means further comprises: a plurality of hinges directly connected to said reflector mirrors respectively, said hinges being pivotally biased along clockwise and counter clockwise directions when said motor is automatically toggled between said alternate operating modes respectively, wherein said reflector mirrors rotate in sync as said hinges pivot and thereby direct, said light rays along said direction.

15. The combined vehicle and associated rear-lighting system of claim 13, wherein said automatic oscillating means further comprises:
- a plurality of positive and negative magnetic cams dynamically mated to anterior and posterior faces of said reflector mirrors respectively;
- a plurality of electro-magnetically polarized plates statically mated to top and bottom interior surfaces of said housing respectively; and
- a toggle switch electrically coupled to an internal power source of said vehicle as well as said electro-magnetically chargeable plates respectively.

16. The combined vehicle and associated rear-lighting system of claim 15, wherein said toggle switch is responsive to said first and second control signals and is thereby biased between open and closed positions respectively;
- wherein said electro-magnetically chargeable plates generate positive and negative magnetic fields and thereby simultaneously attract and repel said positive and negative magnetic cams along mutually exclusive linear paths defined along said anterior and posterior faces of said reflector mirrors respectively;
- wherein each of said reflector mirrors is caused to rotate along first and second arcuate paths as said positive and negative magnetic cams linearly reciprocate along said anterior and posterior faces respectively.

17. A method for automatically illuminating a rear pathway of a vehicle during driving conditions, said method comprising the chronological steps of:
- providing a vehicle including a steering system having a first sensor coupled thereto, and a propulsion system having a second sensor coupled thereto;
- providing and communicatively coupling a rear-lighting system to said steering and propulsion systems respectively, said rear-lighting system further being coupled to a rear bumper of said vehicle;
- emitting a plurality of light rays along the rear pathway extending rearwardly away from a rear bumper of said vehicle;
- said first and second sensors detecting a plurality of vehicle operating parameters associated with said steering and propulsion systems during driving conditions respectively; and
- said rear-lighting system responding to said vehicle operating parameters and thereby causing said light rays to synchronously and uniformly oscillate in a direction corresponding to a travel route and a travel speed of said vehicle respectively.

\* \* \* \* \*